H. BROWN.
CAR STEPS.
APPLICATION FILED MAR. 8, 1921.
1,404,189.
Patented Jan. 24, 1922.
2 SHEETS—SHEET 1.
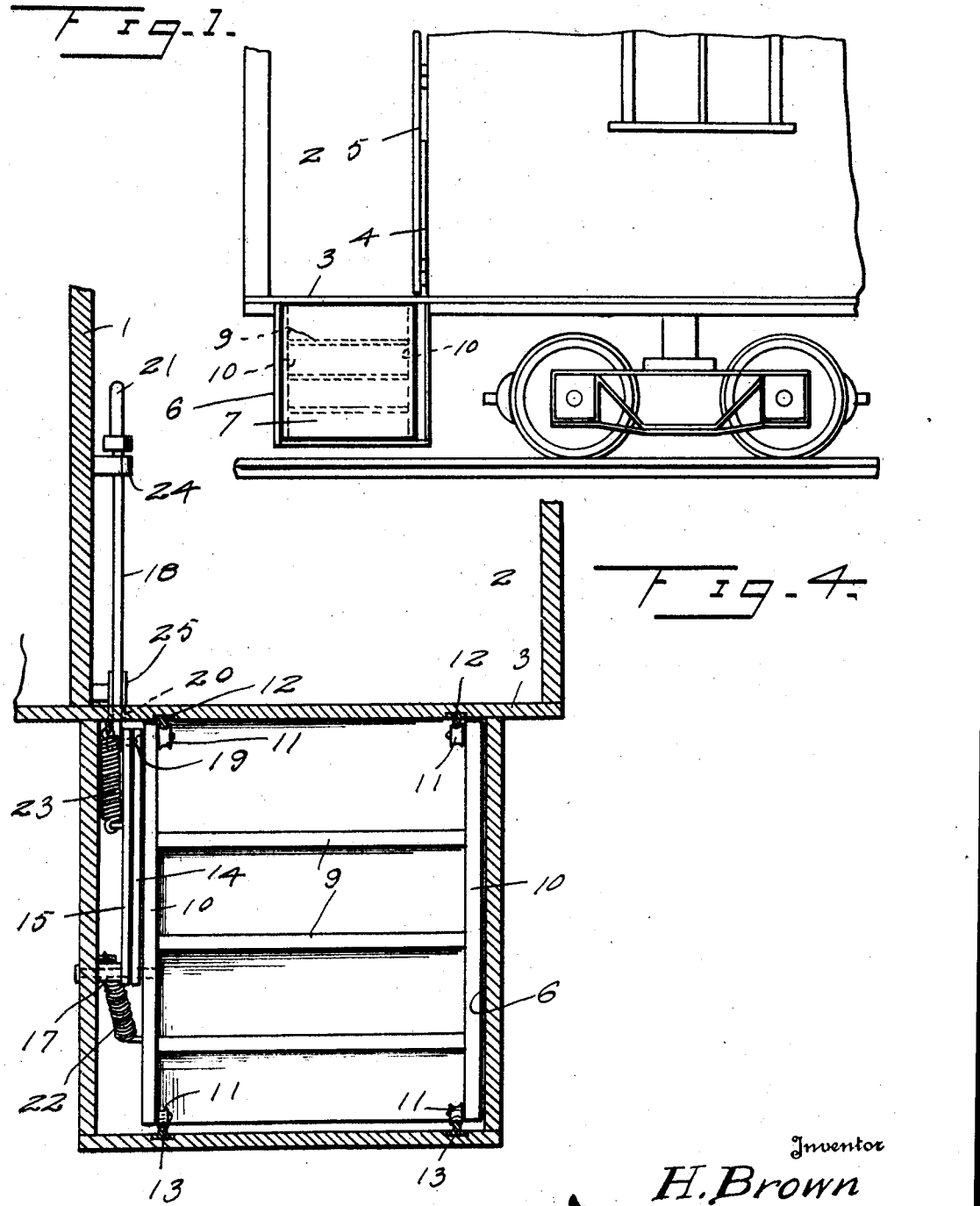
Inventor
H. Brown

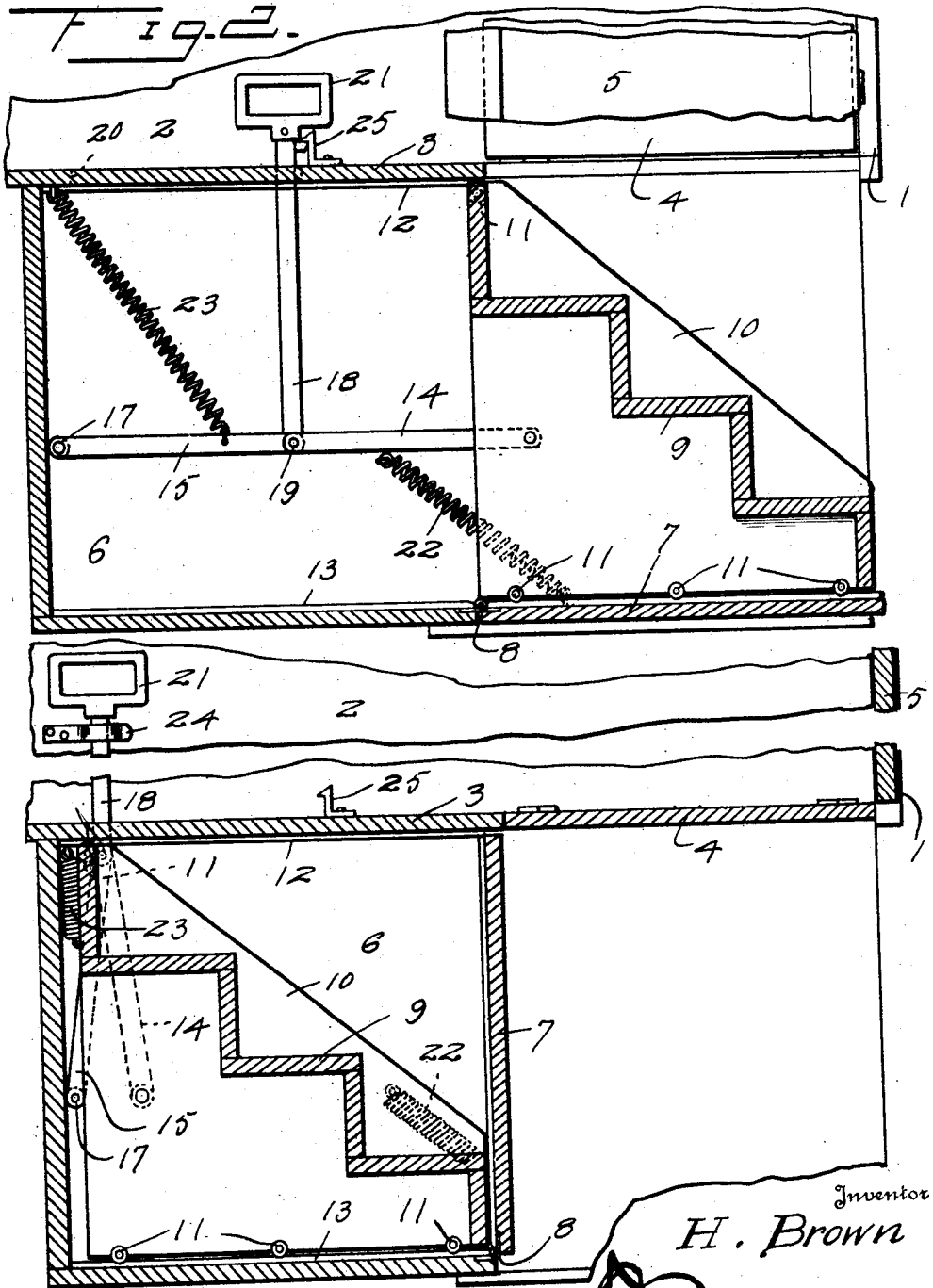

UNITED STATES PATENT OFFICE.

HATTIE BROWN, OF BELLEWOOD, MISSISSIPPI.

CAR STEPS.

1,404,189. Specification of Letters Patent. Patented Jan. 24, 1922.

Application filed March 8, 1921. Serial No. 450,730.

*To all whom it may concern:*

Be it known that I, HATTIE BROWN, a citizen of the United States, residing at Bellewood, in the county of Humphreys and State of Mississippi, have invented certain new and useful Improvements in Car Steps; and I do hereby declare the following to be a full, clear, and exact description of the invention, such as will enable others skilled in the art to which it appertains to make and use the same.

This invention relates to new and useful improvements in car steps and has for its primary object the provision of a mounting for the steps to the car which will completely conceal and prevent the steps from being used or stood upon when in one position thereby obviating numerous accidents caused by the steps being used during the time in which the car is in motion, and also said mounting will permit of the steps being easily moved into a position to allow persons to readily ascend and descend from the car.

Another object of this invention is the provision of a car step of the above stated character which will be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which—

Figure 1 is a fragmentary side elevation, illustrating a car with my invention applied thereto and having the steps in an inoperative position, Figure 2 is a fragmentary sectional view illustrating the steps in an operative position, Figure 3 is a similar view illustrating the steps in an inoperative position, Figure 4 is a longitudinal sectional view illustrating the device.

Referring in detail to the drawings, the numeral 1 indicates a fragmentary portion of a car having the usual vestibule 2 that includes the floor 3, trap door 4, and outer door 5 which is adapted to close the vestibule. The trap door 4 is hinged to the floor 3 so that the same may be swung vertically to permit the stairway to be exposed. The door 5 is adapted to be swung into an open position in front of the trap door 4 when the latter is in its open position. The above description relates to a well known construction of car to which my invention is applied.

A compartment 6 is formed under the flooring 3 and has its front wall closed by a door 7 and the latter is hinged to the bottom wall of the compartment 6 as illustrated at 8 which permits of said door being swung to a position parallel with the bottom wall of the compartment for the purpose of exposing the steps 9. The steps 9 are built into a frame or side members 10 which carry at their upper and lower ends rollers 11 adapted to travel on upper and lower tracks 12 and 13. The lower tracks 13 are secured to the bottom wall of the compartment 6 and also to the inner face of the door 7 and are so constructed that they will permit the door 7 to be moved into open and closed positions. The upper tracks 12 are secured to the under face of the floor 3 of the vestibule 2 and cooperate with the tracks 13 in evenly supporting the steps 9. A link 14 has one end pivoted to the stair frame 10 and its other end pivoted to a link 15 which is in turn pivotally connected to the rear wall of the compartment 6 as illustrated at 17. An operating lever 18 is connected to the links 14 and 15 as illustrated at 19 and extends through a slot 20 in the floor 3 of the vestibule 2 of the car and is provided with a suitable handle 21. By raising the lever 18 upwardly and rearwardly, the steps 9 will be drawn into the compartment 6 and the door 7 will move into a closed position by a spring 22 for concealing the steps. A spring 23 is connected to the link 15 and to the compartment 6 for aiding in moving the steps into the compartment. A catch 24 is carried by the vestibule 2 of the car to engage the handle 21 when the steps are positioned within the compartment to retain said steps in the compartment. A catch 25 is carried by the vestibule 2 to engage the handle 21 for holding the steps in an extended position ready for use. When the steps are in the last named position they underlie the trap door 4 and on opening the trap door 4 and the door 5 persons may readily ascend and descend from the vestibule.

The steps when concealed within the compartment 6 prevents persons from stealing rides on the car or from standing on the steps when the car is in motion thereby obviating numerous accidents and also prevents persons from jumping off and on the car while in motion.

While I have shown and described the preferred embodiment of my invention, it will be understood that minor changes in construction, combination, and arrangement of parts may be made without departing from the spirit and scope of the invention as claimed.

Having thus described my invention what I claim is:—

1. In combination, a car having a vestibule with an outer door and a trap door, steps slidably mounted on the car, and means for moving the steps into operative and inoperative positions, said steps when in an operative position adapted to underlie the trap door and when in an inoperative position to be positioned under the vestibule and inwardly of the trap door.

2. In combination, a car having a compartment, a hinged door for said compartment, steps slidably mounted in said compartment, and an operating means connected to the steps for moving the latter outwardly of the compartment and on the door of the compartment.

3. In combination, a car having a compartment, a hinged door for said compartment and capable of being moved into a position to extend parallel with the bottom wall of the compartment, tracks carried by the compartment and the door, steps slidably mounted on said tracks, and an operating means connected to the steps.

4. In combination, a car having a compartment, a hinged door for said compartment, tension means connected to said door for urging the same into a closed position, tracks carried by the compartment and the door, said door adapted to lie in a plane parallel with the bottom wall of the compartment when in an open position, a stair frame located in the compartment, rollers carried by said frame and mounted on the tracks, steps carried by said frame, and an operating means connected to the frame for moving the steps into and out of the compartment and when outwardly of the compartment adapted to be supported by the door.

5. In combination, a car having a compartment, a hinged door closing said compartment, said door adapted to move into a plane parallel with the bottom wall of the compartment when in an open position, steps slidably mounted in said compartment and when moved out of said compartment adapted to be supported by the door, pivotally connected links pivoted to the compartment and to the steps, an actuating lever connected to said links for moving the steps into and out of the compartment, and catches carried by the car and adapted to engage the lever for holding the same in any one of its positions.

In testimony whereof I affix my signature in presence of two witnesses.

HATTIE BROWN.

Witnesses:
T. E. MORTIMER,
R. H. NASON.